(12) United States Patent
Pudipeddi (10) Patent No.: US 7,779,207 B2
(45) Date of Patent: Aug. 17, 2010

(54) ACCELERATED WRITE PERFORMANCE

(75) Inventor: Ravisankar V. Pudipeddi, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 334 days.

(21) Appl. No.: 11/211,863

(22) Filed: Aug. 25, 2005

(65) Prior Publication Data

US 2007/0050539 A1 Mar. 1, 2007

(51) Int. Cl.
G06F 12/00 (2006.01)
G06F 13/00 (2006.01)
G06F 13/28 (2006.01)

(52) U.S. Cl. ...................................... 711/135
(58) Field of Classification Search .................. 711/113
See application file for complete search history.

(56) References Cited

U.S. PATENT DOCUMENTS

| | | | | |
|---|---|---|---|---|
| 5,559,991 A | * | 9/1996 | Kanfi | 711/162 |
| 6,058,462 A | * | 5/2000 | West et al. | 711/162 |
| 6,496,905 B1 | * | 12/2002 | Yoshioka et al. | 711/154 |
| 7,096,321 B2 | * | 8/2006 | Modha | 711/134 |
| 2004/0117106 A1 | * | 6/2004 | Dudel et al. | 701/115 |
| 2005/0172228 A1 | * | 8/2005 | Kakuda | 715/530 |

* cited by examiner

Primary Examiner—Christian P Chace
Assistant Examiner—Gary W Cygiel
(74) Attorney, Agent, or Firm—Woodcock Washburn LLP (57) ABSTRACT

A generic disk driver filter may be used to accelerate performance when writing to a disk. The generic disk driver filter may be connected between a file system and a disk driver and may be configured to be extensible and compatible with a variety of different file systems and different disk drivers. The generic disk driver filter has a filter component that intercepts and filters raw sector write commands from the file system before they are received by the disk driver. The generic disk driver filter may also have a cache memory component that stores a checksum for each sector which is written to the disk. The generic disk driver filter may also have a scavenger thread component that detects and removes latent checksum entries from the cache memory so as to preserve memory availability and reduce memory requirements.

8 Claims, 6 Drawing Sheets

ACCELERATED WRITE PERFORMANCE

BACKGROUND

A number of commonly employed procedures may reduce performance when writing data to a disk. For example, when writing to portable media, performance may be reduced due to aggressive flushing/write through procedures that provide resiliency in the case of surprise removal of the media. While these flushing procedures are quite important, their resulting performance reductions may be a significant component in determining the amount of time required for writing data to a disk. The performance reductions may be further increased when there is a higher ratio of metadata to actual user data, such as when writing larger quantities of smaller files.

The aggressive flushing/write-through procedures often require an overwhelming number of redundant writes due to the flush granularity of a page size. For example, consider an approximately 4 kilobyte page divided into eight sectors of 512 bytes each, which are subdivided into eight entries of 64 bytes each. In this example, assume that the flushing procedures require 5 flushes when creating a directory entry. Also assume that a filesystem writes through changes to a disk instead of caching the changes and gathering the writes. When files are created, metadata for each file takes up an entry with a size of 64 bytes. So as lots of files are being created, as in the case of a copy of a tree, each entry is created and written out. As a result, eight 64 byte entries can be created per sector, flushing each sector 8 times. Since the filesystem writes each sector through five times, that results in 40 unavoidable redundant flushes. However, in addition to these unavoidable redundant flushes, the filesystem is also writing out the remaining 7 sectors in the page. Each of these additional seven sectors is being flushed forty times, which results in 280 avoidable redundant flushes.

SUMMARY

A generic disk driver filter may be used to accelerate performance when writing to a disk. The generic disk driver filter may be connected between a file system and a disk driver and may be configured to be extensible and compatible with a variety of different file systems and different disk drivers. The generic disk driver filter has a filter component that intercepts and filters raw sector write commands from the file system before they are received by the disk driver. The generic disk driver filter may also have a cache memory component that stores a checksum for each sector which is written to the disk. The generic disk driver filter may also have a scavenger thread component that detects and removes latent checksum entries from the cache memory so as to preserve memory availability and reduce memory requirements.

The filter component may filter a raw sector write command by computing a checksum for each sector that is included in the raw sector write command. Each sector's computed checksum may then be compared with a corresponding stored checksum from the cache memory. Each sector with matching computed and stored checksums may be designated as redundant, while each sector with non-matching computed and stored checksums may be designated as non-redundant. A sub-set of non-redundant sectors within the raw sector write command may then be identified and flushed to the disk. The redundant sectors within the raw sector write command are not flushed to the disk, thereby accelerating write performance.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The illustrative embodiments will be better understood after reading the following detailed description with reference to the appended drawings, in which.

DETAILED DESCRIPTION

Figure 1:
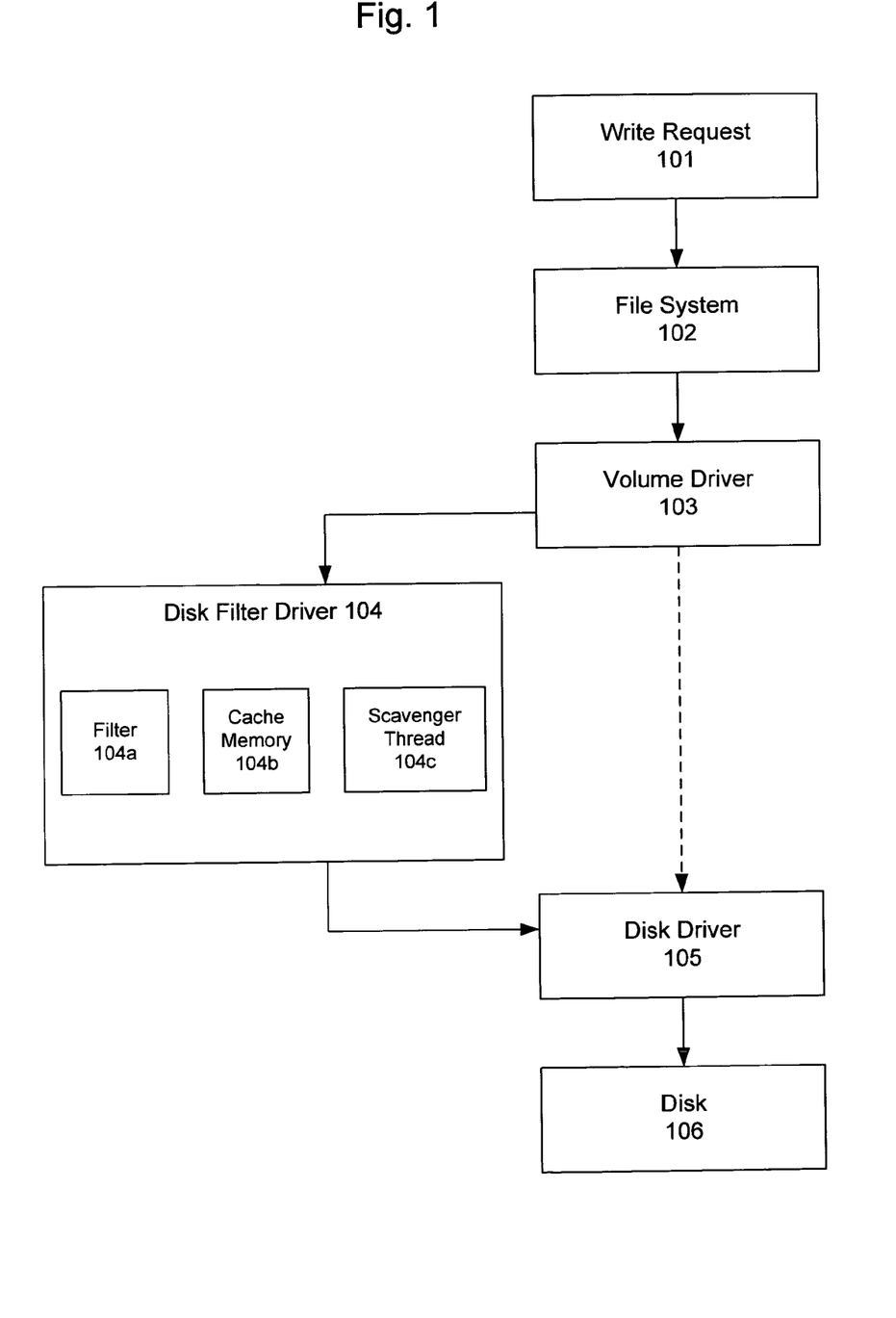
FIG. 1 depicts an exemplary system for accelerated write performance.

An exemplary system for accelerated write performance is depicted in FIG. 1. A write request 101 is submitted to file system 102. Write request 101 may, for example, be issued by a user or by an application or other component. Write request 101 is a request to write data to disk 106. Disk 106 may be, for example, a hard drive or a portable media device such as CD, DVD, or a flash card. Write request 101 may be a request to write data from one type of disk to another type of disk.

File system 102 may include a file allocation table (FAT) system that describes the files and directories available on disk 106. Such a FAT system may be, for example, FAT16 or FAT32, both from MICROSOFT Corp. of Redmond, Wash. File system 102 processes the write request and issues a raw sector write command. The write request 101 is processed in accordance with appropriate procedures which may depend on factors such as, for example, the type of disk 106 to which data is being written and other general circumstances surrounding the write request 101. As set forth above, these procedures may reduce performance when writing data to disk 106.

File system 102 issues the raw sector write command to volume driver 103, which is basically an abstraction of disk 106. In conventional computing devices, volume driver 103 may forward the raw sector write command directly to disk driver 105, as represented by the dashed line between volume driver 103 and disk driver 105. However, in the exemplary system of FIG. 1, a generic disk driver filter 104 is provided between volume driver 103 and disk driver 105. Generally, generic disk driver filter 104 accelerates write performance by intercepting and filtering the raw sector write request from file system 102 before it is submitted to the disk driver 105.

Generic disk driver filter 104 may be extensible and compatible with a variety of different file systems 102 and different disk drivers 105. Generic disk driver filter 104 may be a "hard" component which is built into a computing device or may be a component or application that can be delivered to or from, connected, and/or removed from a computing device. Also, generic disk driver filter 104 need not necessarily be a component or application which is separate and distinct from other components in the system of FIG. 1. For example, all or portions of generic disk driver filter 104 may be part of file system 102 or disk driver 105.

Generic disk driver filter 104 includes a filter component 104a which receives and filters the raw sector write command. Exemplary filtering techniques which may be employed by filter component 104a are described in detail below with reference to FIG. 2. Generic disk driver filter 104 may also include a cache memory component 104b that stores a checksum for each sector which is written to disk 106. Cache memory component 104b need not necessarily be a separate component and may be part of another memory component that is accessible to filter component 104a. Generic disk driver filter 104 may also include a scavenger thread component 104c that detects and removes latent checksum entries from cache memory 104b so as to preserve memory availability and reduce memory requirements. Scavenger thread 104c need not necessarily be a separate component. Exemplary techniques which may be employed by scavenger thread 104c to regulate cache memory 104b are described in detail below with reference to FIG. 4.

Figure 2:
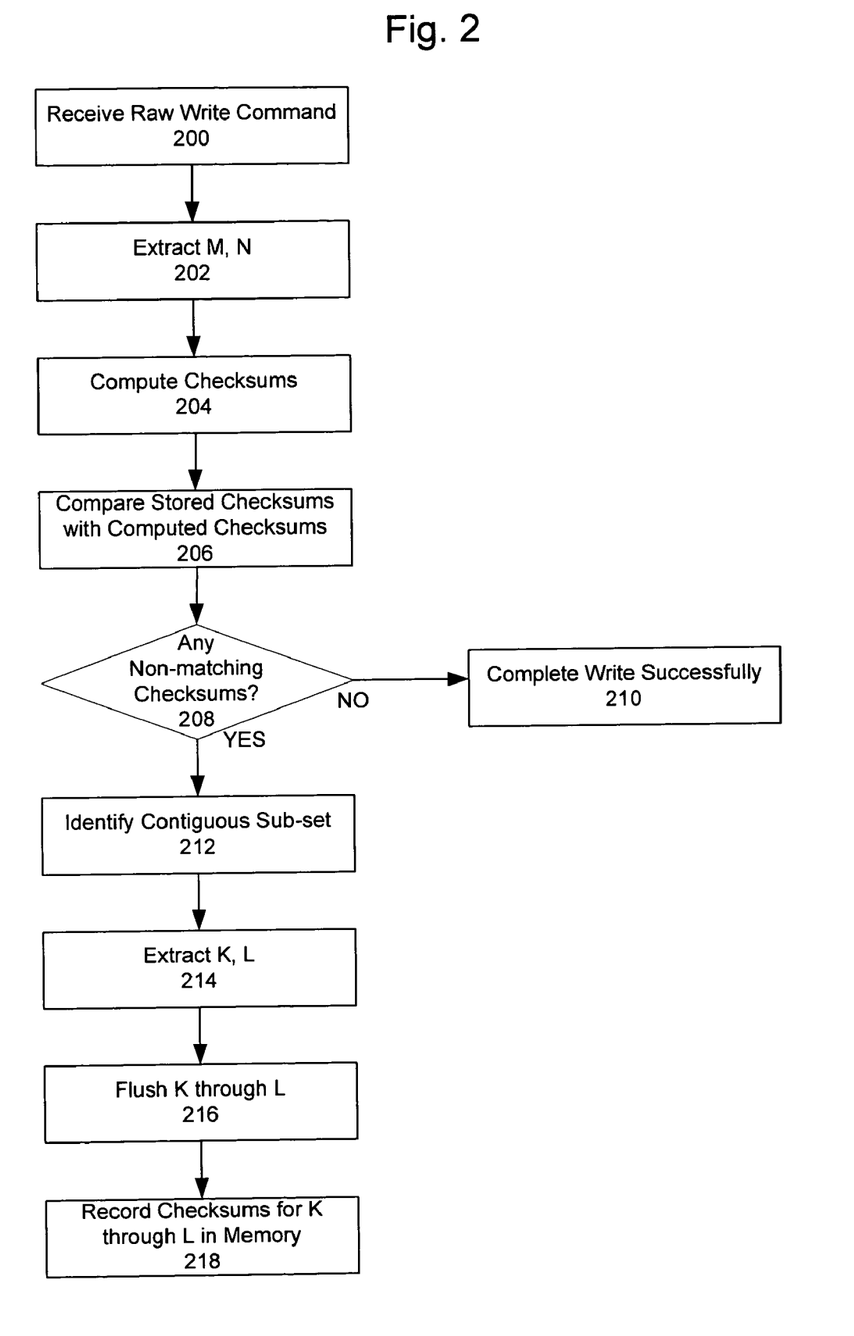
FIG. 2 is a flowchart of an exemplary method for accelerated write performance.
Figure 3A:
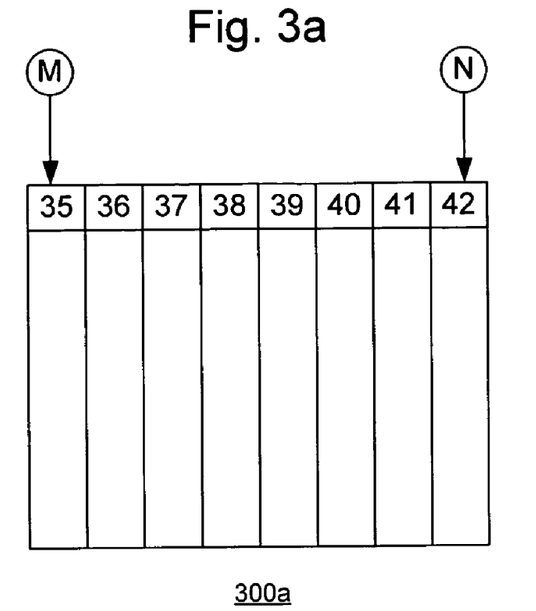
FIGS. 3a-c depict exemplary data pages.

A flowchart of an exemplary method for accelerated write performance is shown in FIG. 2. At act 200, filter 104a receives a raw sector write command from file system 102. The raw sector write command may be received directly from file system 102 or by way of a volume driver 103 or another similar component. The raw sector write command may be a command to write a page of data to disk 106. Such a data page may include a set of contiguous sectors. For example, an approximately 4 kilobyte page may include a set of eight contiguous sectors each with 512 bytes of data. An exemplary eight sector data page 300a is depicted in FIG. 3a. As shown, page 300a includes sectors 35 through 42. The raw sector write command may also be for less than or more than a page of data. There is no upper or lower bound on the number of sectors that are written out in a single request.

At act 202, filter 104a extracts a beginning sector number ("M") and an end sector number ("N") from the raw sector write command. For eight sector data page 300a, sector 35 will be extracted as beginning sector number ("M"), and sector 42 will be extracted as end sector number ("N").

At act 204, filter 104a computes a checksum for each of sectors M through N. The computed checksum may be a cyclic redundancy check (CRC) that is computed over the contents of the entire sector. Alternatively, other checksums such as, for example, MD4 and MD5 checksums may also be employed. Generally, the stronger the checksum, the less likelihood there will be for a false match. However, it has been observed that the likelihood of a false match will be quite low even when a CRC checksum is employed.

At act 206, the checksums computed at act 204 are compared with previously computed checksums that are stored in cache memory 104b. Specifically, the newly computed checksum for each sector is compared with the corresponding stored checksum for the sector. Of course, it is possible that this will be the first time that some or all of the sectors M through N have been written to. In this scenario, there will not be a stored checksum for these sectors within cache memory 104b.

At act 208, it is determined whether any of the sectors have newly computed checksums which do not match their corresponding stored checksums. For purposes of this determination, any sector which does not have a corresponding stored checksum will be considered to have a non-matching stored checksum. If, at act 208, it is determined that none of the sectors M through N have non-matching checksums, then all sectors in the write command are redundant, and, at act 210, the write command is completed successfully by disk driver filter 104 without submitting the write command to disk driver 105, thereby producing a boost in performance.

Figure 3B:
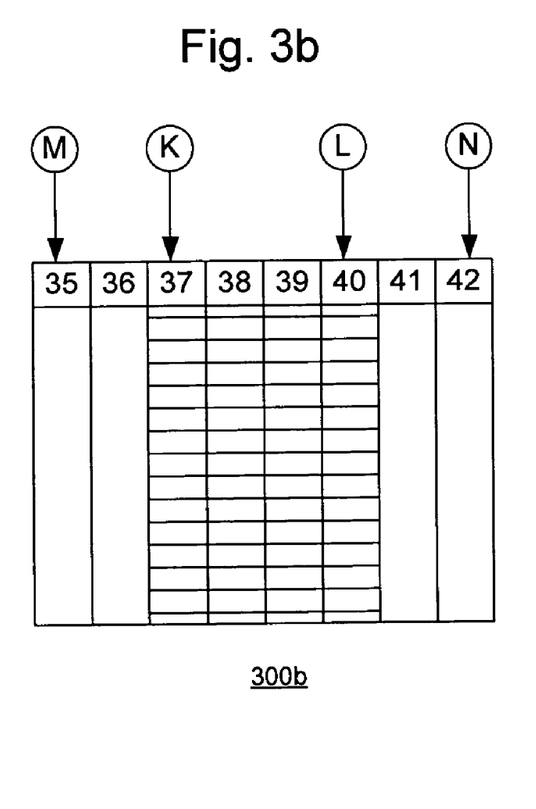

If, on the other hand, at act 208, it is determined that at least one of the sectors M through N has a non-matching checksum, then the write command will not be canceled. Rather, at act 212, a contiguous sub-set of the sectors M through N with non-matching checksums will be identified. The contiguous sub-set may include all of sectors M through N or only some of sectors M through N. The sub-set must, however, include at least one sector. The sectors within the contiguous sub-set will include at least some non-redundant data. An exemplary eight sector data page 300b with a contiguous non-redundant sub-set of sectors is depicted in FIG. 3b. As shown, page 300b includes sectors 35 through 42 and non-redundant sub-set 37 through 40, which is represented by horizontal grid lines.

Figure 3C:
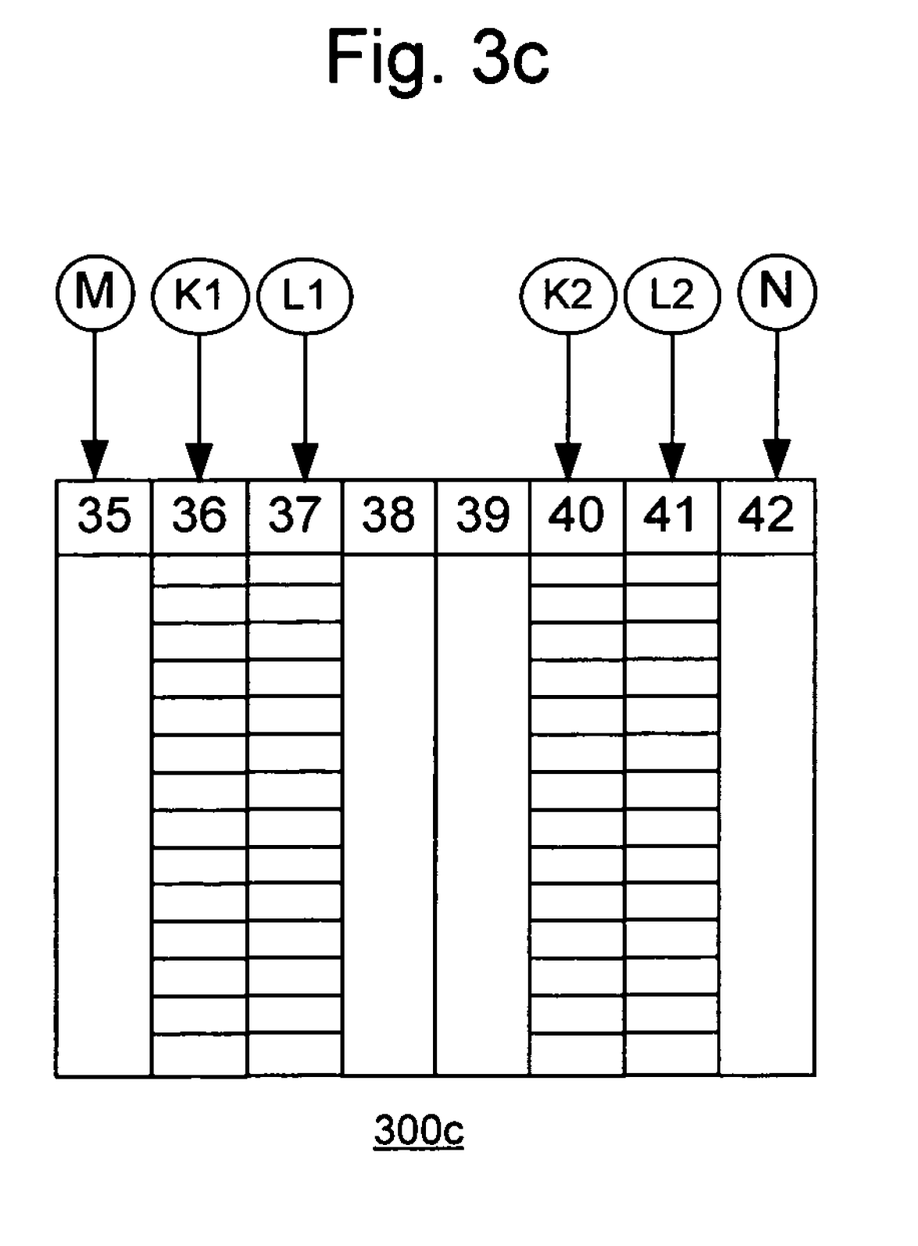

At act 214, filter 104a extracts a beginning sub-set number ("K") and an end sub-set number ("L") from the write command. For exemplary page 300b, sector 37 will be extracted as beginning sub-set number ("K"), and sector 40 will be extracted as end sub-set number ("L"). If an entire page is non-redundant, then K will be equal to M and L will be equal to N. On the other hand, if there is only a single non-redundant sector in a page, then K will be equal to L. It should be appreciated that, in certain circumstances, a page may have more than one non-redundant contiguous sub-set of sectors. An example of this scenario is depicted in FIG. 3c. As shown, page 300c has two non-redundant contiguous sub-sets. The first is sub-set 36 through 37, while the second is sub-set 40 through 41. In this case sector 36 is designated as "K1" and sector 40 is designated as "K2", while sector 37 is designated as "L1" and sector 41 is designated as "L2."

At act 216, extracted sectors K through L are flushed to disk driver 105. If there are multiple non-redundant contiguous sub-sets, then K through L will be flushed for each of the sub-sets (e.g. K1 through L1; K2 through L2; ...; Kn through Ln). At act 218, checksums for each sector in the redundant sub-set(s) K through L are stored in cache memory 104b.

Given the number of sectors which may eventually be written and rewritten to disk 106, cache memory 104b will fill up very quickly if the checksums for every sector are maintained in memory over the duration of writes to disk 106. This will result in potentially huge memory requirements for cache memory 104b. However, since redundant flushes normally occur in close proximity to one another, memory for "latent" checksums that have not been recently written to may be reclaimed, while memory for "active" checksums that have been recently written or rewritten may be preserved. Cache memory 104b may be regulated in this fashion through the use of scavenger thread 104c. Specifically, each memory slot within cache memory 104b may have a corresponding use bit which is regulated by scavenger thread 104c to indicate whether or not the memory slot is storing an active checksum.

Scavenger thread 104c may regulate the use bits by conducting a number of passes through cache memory 104b. The duration of time between each pass may be based on a predetermined time period. The time period may be a default time period or may be a time period that is selected by a user or other application based on usage data and/or other circumstances surrounding the writing of data to disk 106. The time period may be a fixed time period or a variable period. If the time period is set too low, then scavenger thread 104c will pass through cache memory 104b too frequently, which could possibly slow the performance of generic disk driver filter 104. On the other hand, if the time period is set too high, then scavenger thread 104c will not pass through cache memory 104b frequently enough, meaning that too many latent checksum entries may remain stored in cache memory 104b. This could result in unduly large memory requirements and, if the memory becomes full, could result in a situation in which there is no availability for storage of active checksums. Thus, it is important that the time period between passes be set for a time that is not too low or too high.

Figure 4:
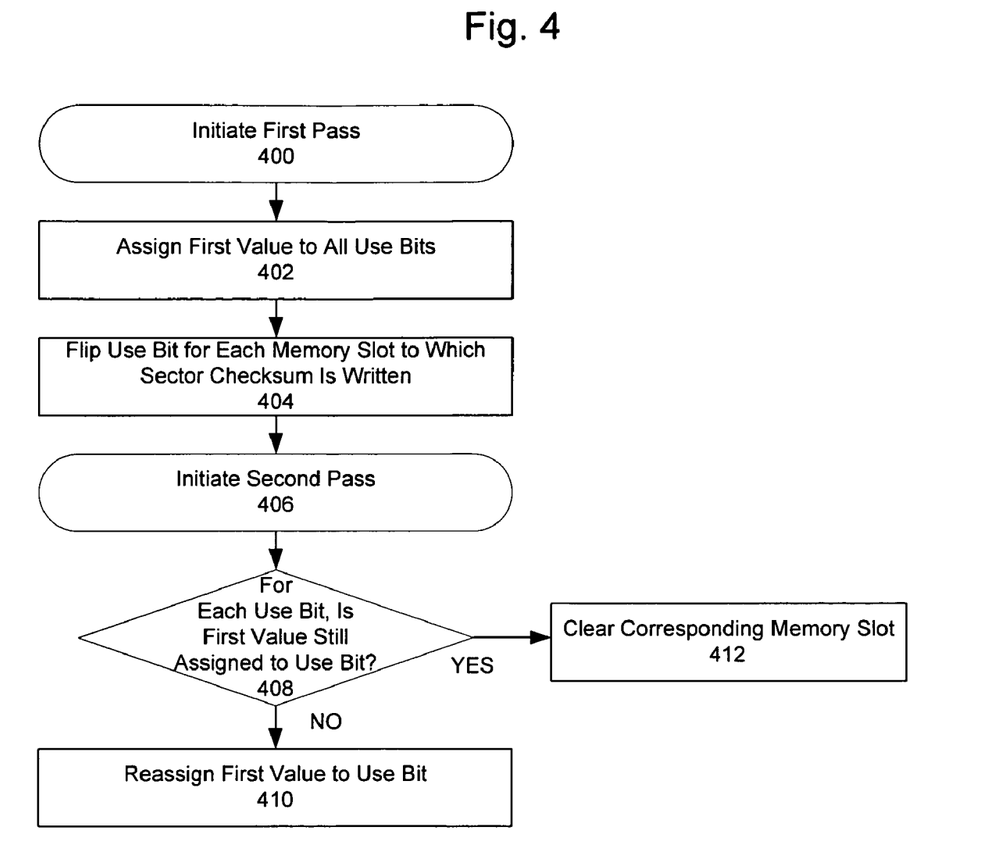
FIG. 4 is a flowchart of an exemplary method for regulating a disk driver filter cache.

A flowchart of an exemplary method for regulating filter cache 104b is shown in FIG. 4. At act 400, scavenger thread 104c initiates a first pass through cache memory 104b. At act 402, during the first pass, scavenger thread 104c assigns a first value (i.e. a value of zero) to all the use bits for all the memory slots within cache memory 104b, thereby essentially resetting the use bits. At act 404, each time that a sector checksum is written to a memory slot, the corresponding use bit for the memory slot is flipped by assigning a second value to the use bit (i.e. the value of the use bit is flipped from zero to one).

At act 406, scavenger thread 104c initiates a second pass through cache memory 104b. At act 408, as part of the second pass, scavenger thread 104c evaluates each use bit on an individual basis to determine whether the first value is still assigned to the use bit. If the first value is still assigned to the use bit, this means that a sector checksum has not been written the corresponding memory slot since the first pass. Thus, the memory slot is either empty or is storing a latent sector checksum. Accordingly, at act 412, the memory slot may be cleared so that it is available to store any newly recorded sector checksums. If, on the other hand, the first value is not still assigned to the use bit (i.e. the use bit has been flipped), this means that a sector checksum has been written to the use bit's corresponding memory slot since the first pass. Thus, there is an active sector checksum stored in the memory slot. At act 410, the first value is reassigned to the use bit. The first value is reassigned so that, on the next pass, it can be determined whether or not the memory slot is still storing an active checksum. As should be appreciated, during the next pass, and any subsequent pass, steps 408-412 may be repeated.

To possibly improve efficiency, rather than allocating use bits to individual sectors, use bits may be allocated to "regions," which are collections of contiguous sectors. If any sectors within the region are written to, then the use bit for the region may be assigned the first value. Thus, during the second pass, if none of the sectors within the region have been written to, then the entire region may released from cache memory 104b. Since redundant flushes normally occur in close proximity to one another, the use of regions may improve efficiency by preserving checksums for a number of sectors that are in close proximity to an active sector, while also deleting checksums for those sectors which are no longer in close proximity to an active sector.

Figure 5:
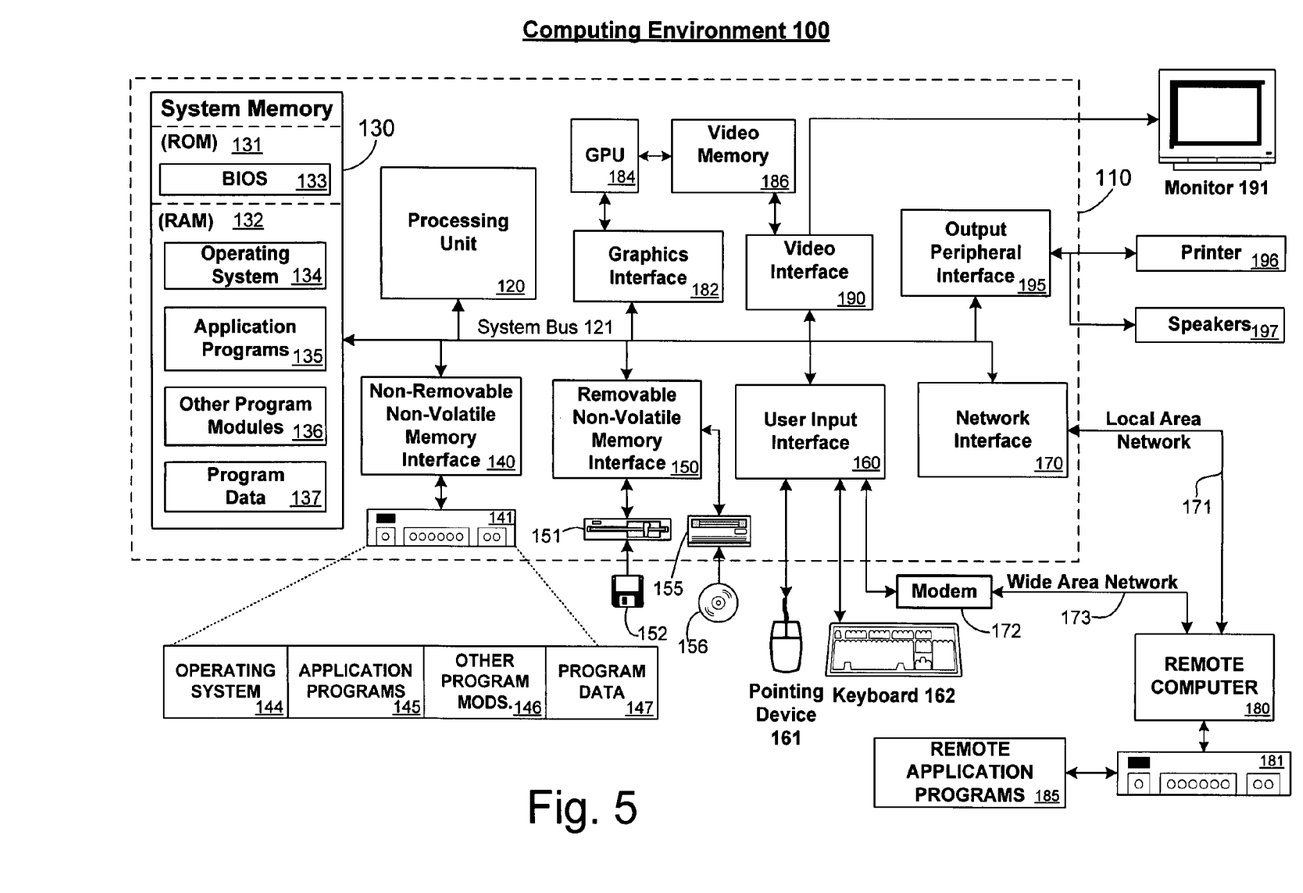
FIG. 5 is a block diagram representing an exemplary computing device.

FIG. 5 illustrates an example of a suitable computing system environment 100 in which the subject matter described above with reference to FIGS. 1-4 may be implemented. The computing system environment 100 is only one example of a suitable computing environment and is not intended to suggest any limitation as to the scope of use or functionality of the subject matter described above. Neither should the computing environment 100 be interpreted as having any dependency or requirement relating to any one or combination of components illustrated in the exemplary operating environment 100.

With reference to FIG. 5, computing system environment 100 includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media include, but are not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embody computer readable instructions, data structures, program modules or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 5 illustrates operating system 134, application programs 135, other program modules 136, and program data 137.

The computer 110 may also include other removable/non-removable, volatile/nonvolatile computer storage media. By way of example only, FIG. 5 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD-RW, DVD-RW or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 5 provide storage of computer readable instructions, data structures, program modules and other data for the computer 110. In FIG. 5, for example, hard disk drive 141 is illustrated as storing operating system 144, application programs 145, other program modules 146 and program data 147. Note that these components can either be the same as or different from operating system 134, application programs 135, other program modules 136 and program data 137. Operating system 144, application programs 145, other program modules 146 and program data 147 are given different numbers here to illustrate that, at a minimum, they are different copies. A user may enter commands and information into the computer 110 through input devices such as a keyboard 162 and pointing device 161, such as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A graphics interface 182 may also be connected to the system bus 121. One or more graphics processing units (GPUs) 184 may communicate with graphics interface 182. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked or distributed environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 5. The logical connections depicted in FIG. 5 include a local area network (LAN) 171 and a wide area network (WAN) 173, but may also include other networks/buses. Such networking environments are commonplace in homes, offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 5 illustrates remote application programs 185 as residing on memory device 181. It will be appreciated that the network connections shown are exemplary and other means of establishing a communications link between the computers may be used.

Although the subject matter has been described in language specific to the structural features and/or methodological acts, it is to be understood that the subject matter defined in the appended claims is not necessarily limited to the specific features or acts described above. Rather, the specific features or acts described above are disclosed as example forms of implementing the claims.

What is claimed:

1. A method for accelerating performance when writing a set of sectors to a disk, the method comprising:
receiving a write command in a computer comprising a disk filter driver and a disk driver;
computing a checksum for each sector in the set of sectors;
storing the computed checksums in a cache memory comprising a plurality of memory slots each configured to store a checksum representing a respective sector;
grouping sets of continuous sectors into regions, each region including at least two contiguous sectors, each region associated with a respective use bit;
comparing each computed checksum with a stored checksum for the corresponding sector;
if all of the sectors in the set of sectors have computed checksums that match their corresponding stored checksums, then using the disk filter driver to complete the write command without submitting the write command to the disk driver;
if at least one sector in the set of sectors has a computed checksum that does not match a corresponding stored checksum, identifying a contiguous sub-set of the set of sectors, the contiguous sub-set comprising at least two sectors, each sector within the contiguous sub-set having a computed checksum that does not match its corresponding stored checksum;
flushing the contiguous sub-set to the disk during a single write operation; and
releasing some of the stored checksums from the cache memory if their corresponding sectors have not been rewritten within a predetermined time period by assigning a first value to all of the use bits during a first pass through the cache memory, assigning a second value to each use bit associated with a region that includes a sector that is associated with a memory slot in which a checksum has been stored, and, during a second pass through the cache memory, clearing the memory slots associated with the sectors within regions corresponding to the use bits to which the first value is assigned and reassigning the first value to the use bits to which the second value is assigned.

2. The method of claim 1, comprising flushing the contiguous sub-set to a flash media.

3. The method of claim 1, comprising computing a cyclic redundancy check checksum for each sector in the set of sectors.

4. The method of claim 1, wherein comparing each computed checksum with a stored checksum comprises determining that a computed checksum does not match a stored checksum if there is no stored checksum in memory for a corresponding sector.

5. The method of claim 1, further comprising:
identifying another contiguous sub-set of the set of contiguous sectors, each sector within the other contiguous sub-set having a computed checksum that does not match its corresponding stored checksum; and
flushing the other contiguous sub-set to the disk.

6. The method of claim 1, further comprising deleting the computed checksums from the cache memory if the set of sectors is not rewritten to within a pre-determined time period.

7. A computer-readable storage medium having computer-executable instructions that, when executed, cause a computer to perform a method for accelerating performance when writing a set of sectors to a disk, the method comprising steps of:
receiving a write command in a computer comprising a disk filter driver and a disk driver;
computing a checksum for each sector in the set of sectors;

storing the computed checksums in a cache memory comprising a plurality of memory slots each configured to store a checksum representing a respective sector;
grouping sets of continuous sectors into regions, each region including at least two contiguous sectors, each region associated with a respective use bit;
comparing each computed checksum with a stored checksum for the corresponding sector;
if all of the sectors in the set of sectors have computed checksums that match their corresponding stored checksums, then using the disk filter driver to complete the write command without submitting the write command to the disk driver;
if at least one sector in the set of sectors has a computed checksum that does not match a corresponding stored checksum, identifying a contiguous sub-set of the set of sectors, the contiguous sub-set comprising at least two sectors, each sector within the contiguous sub-set having a computed checksum that does not match its corresponding stored checksum;
flushing the contiguous sub-set to the disk during a single write operation; and
releasing some of the stored checksums from the cache memory if their corresponding sectors have not been rewritten within a predetermined time period by assigning a first value to all of the use bits during a first pass through the cache memory, assigning a second value to each use bit associated with a region that includes a sector that is associated with a memory slot in which a checksum has been stored, and, during a second pass through the cache memory, clearing the memory slots associated with the sectors within regions corresponding to the use bits to which the first value is assigned and reassigning the first value to the use bits to which the second value is assigned.

8. A system for accelerating performance when writing a set of sectors to a disk comprising:
a processor; and
memory having stored therein computer-executable instructions that, when executed, cause a computer to perform acts comprising:
receiving a write command in a computer comprising a disk filter driver and a disk driver;
computing a checksum for each sector in the set of sectors;
storing the computed checksums in a cache memory comprising a plurality of memory slots each configured to store a checksum representing a respective sector;
grouping sets of continuous sectors into regions, each region including at least two contiguous sectors, each region associated with a respective use bit;
comparing each computed checksum with a stored checksum for the corresponding sector;
if all of the sectors in the set of sectors have computed checksums that match their corresponding stored checksums, then using the dish filter driver to complete the write command without submitting the write command to the disk driver;
if at least one sector in the set of sectors has a computed checksum that does not match a corresponding stored checksum, identifying a contiguous sub-set of the set of sectors, the contiguous sub-set comprising at least two sectors, each sector within the contiguous sub-set having a computed checksum that does not match its corresponding stored checksum;
flushing the contiguous sub-set to the disk during a single write operation; and
releasing some of the stored checksums from the cache memory if their corresponding sectors have not been rewritten within a predetermined time period by assigning a first value to all of the use bits during a first pass through the cache memory, assigning a second value to each use bit associated with a region that includes a sector that is associated with a memory slot in which a checksum has been stored, and, during a second pass through the cache memory, clearing the memory slots associated with the sectors within regions corresponding to the use bits to which the first value is assigned and reassigning the first value to the use bits to which the second value is assigned.

* * * * *

UNITED STATES PATENT AND TRADEMARK OFFICE
CERTIFICATE OF CORRECTION

| | | |
|---|---|---|
| PATENT NO. | : 7,779,207 B2 | Page 1 of 1 |
| APPLICATION NO. | : 11/211863 | |
| DATED | : August 17, 2010 | |
| INVENTOR(S) | : Ravisankar V. Pudipeddi | |

It is certified that error appears in the above-identified patent and that said Letters Patent is hereby corrected as shown below:

In column 10, line 16, in Claim 8, delete "dish" and insert -- disk --, therefor.

Signed and Sealed this
Fifteenth Day of February, 2011

David J. Kappos
*Director of the United States Patent and Trademark Office*